United States Patent [19]

Rhodes et al.

[11] 4,241,771
[45] Dec. 30, 1980

[54] BEARING ASSEMBLY FOR AN AUTOMATIC SHAPING DEVICE

[76] Inventors: Arthur J. Rhodes, 2606 Benoch; William J. Rhodes, 3343 Camp Ground Rd., both of, Louisville, Ky. 40216

[21] Appl. No.: 1,522

[22] Filed: Jan. 8, 1979

[51] Int. Cl.³ .......................... B23C 1/18; B27C 5/02
[52] U.S. Cl. ........................... 144/145 A; 144/145 C; 144/154; 308/220; 409/97
[58] Field of Search ............... 144/137, 145 R, 145 A, 144/145 B, 145 C, 154, 143, 323; 409/97, 103; 308/220, 221, 230, 237, 22, 178, 187.1

[56] References Cited

U.S. PATENT DOCUMENTS

| 97,440 | 11/1869 | Piper | 308/220 |
|---|---|---|---|
| 657,406 | 9/1900 | Fouts | 308/220 |
| 2,364,951 | 12/1944 | Corte | 308/221 |
| 3,166,780 | 1/1965 | Schultz, Jr. | 308/230 |
| 3,447,420 | 6/1969 | Rhodes et al. | 144/145 R |
| 3,459,104 | 8/1969 | Parsons, Sr. | 409/97 |
| 3,473,580 | 10/1969 | Dunn et al. | 144/145 R X |
| 3,476,159 | 11/1969 | Hawkins | 144/145 R X |
| 3,880,048 | 4/1975 | Zimmerman | 144/145 A X |
| 4,036,269 | 7/1977 | Rhodes | 144/145 R X |

FOREIGN PATENT DOCUMENTS 49011 7/1938 France ...................... 308/220

Primary Examiner—W. Donald Bray

[57] ABSTRACT

An improved bearing assembly for automatic shaping equipment wherein the bearing assembly includes a split cellar having a rotatable upper portion and a stationary lower portion, the upper portion receives a template thereon and moves in response to movement of the template. Bearings are disposed between the upper and lower portions.

5 Claims, 3 Drawing Figures

BEARING ASSEMBLY FOR AN AUTOMATIC SHAPING DEVICE

BACKGROUND OF THE INVENTION

1. Field of the Invention

This invention relates to improved automatic shaping equipment and particularly relates to an improved bearing assembly for automatic shaping equipment.

2. Discussion of the Prior Art

In the production of duplicate parts having irregular shapes, such as, for example, pieces that go into making wood furniture, many different types of feeding devices are used for feeding workpieces to cutting or shaping machines. Most of the feeding devices include means to mount templates or patterns thereon with means to follow the patterns and feed the workpieces to cutting or shaping machines in conformity with a predetermined pattern. In many of the feed devices, the means for feeding workpieces in conformity with a predetermined pattern are generally complex and require a great deal of skill and time on the part of the operator in order to maintain the feeding and shaping machines at reasonable production rates. One such shaper is disclosed in U.S. Pat. No. 3,447,420.

SUMMARY OF THE INVENTION

The present invention advantageously provides an improved bearing assembly for an automatic shaping device. The present invention further provides a bearing assembly for the feed means for an automatic shaping device. The present invention even further provides a bearing assembly which is easily assembled and disassembled in the feed means for an automatic shaping device.

Various other features of the present invention will occur to those skilled in the art upon reading the disclosure set forth hereinafter.

More particularly, the present invention provides in an automatic shaping device that includes a frame, a table mounted onto said frame, a movable template mounted onto said table, shaping means mounted above said table, and means to feed workpieces to said shaping means; the improvement comprising: bearing means supporting said template and movable in response to movement of said template.

It is to be understood that the description of the present invention given hereinafter are not by way of limitation and various modifications within the scope of the present invention will occur to those skilled in the art upon reading the disclosure set forth hereinafter.

BRIEF DESCRIPTION OF THE DRAWING

Referring to the drawing.

DESCRIPTION OF THE PREFERRED EMBODIMENT

Figure 2:
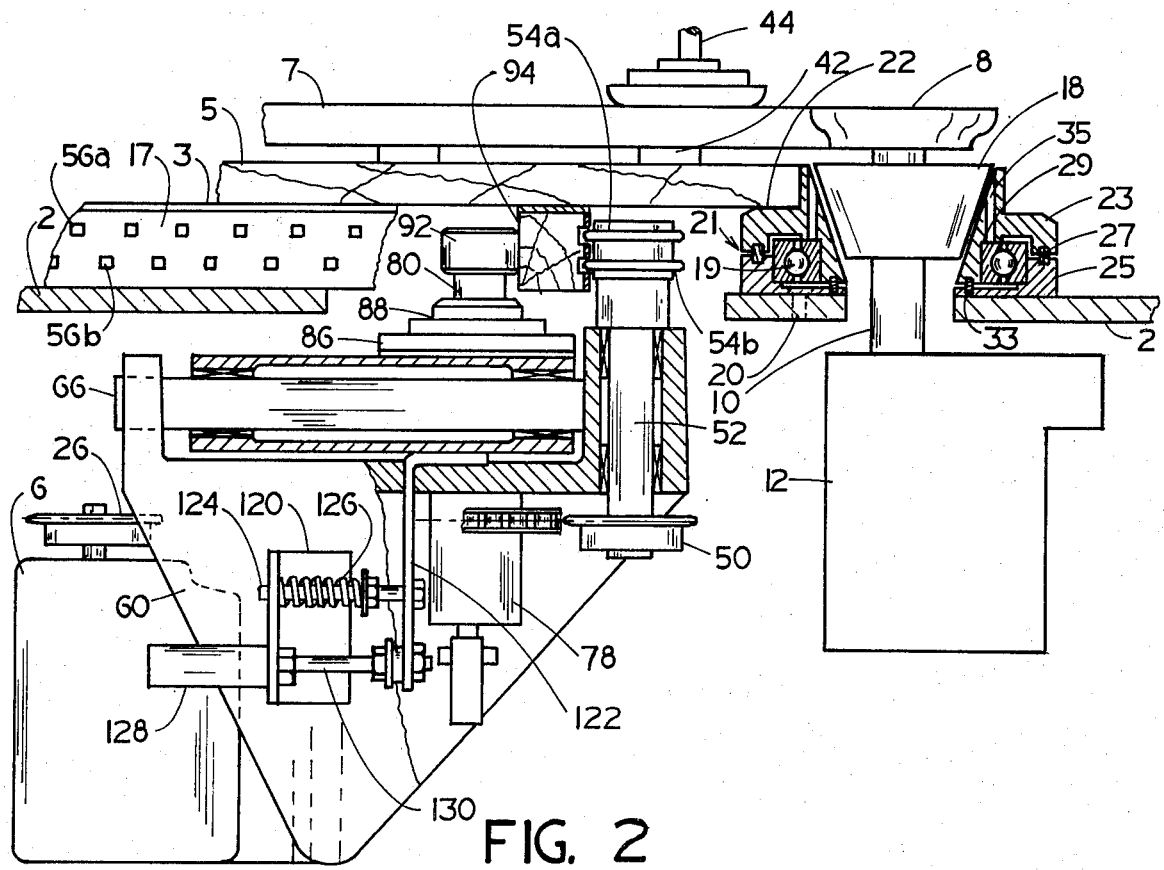
FIG. 2 is an elevational view with selected portions cutaway of the feed device of FIG. 1; and, FIG. 3 is an enlarged perspective view, with selected portions cutaway of a preferred bearing assembly of FIG. 1.
Figure 3:
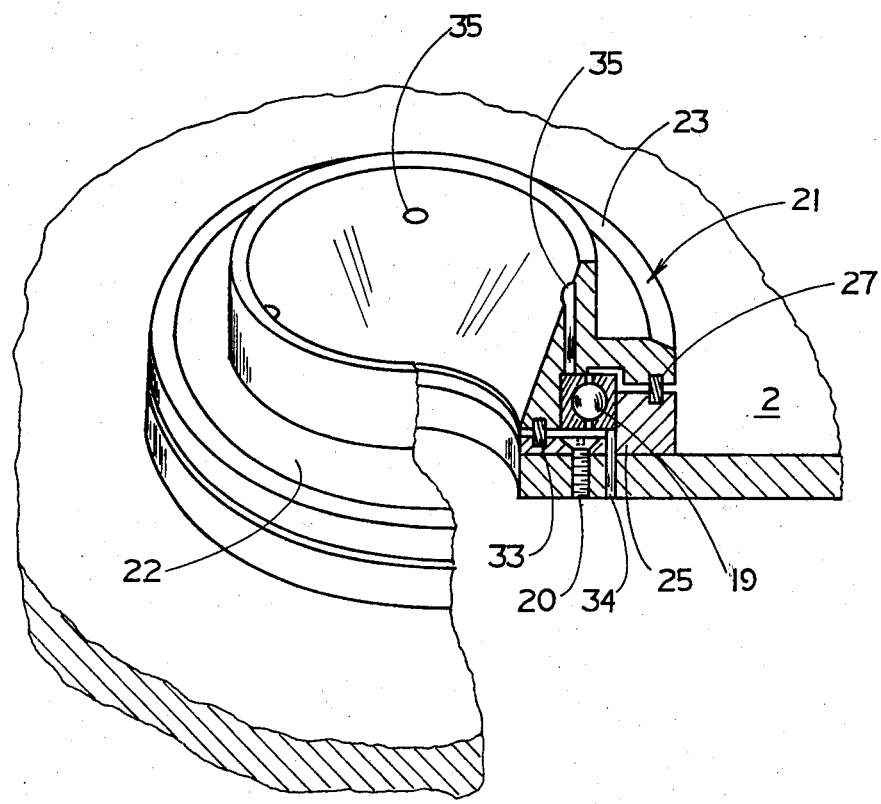

In a preferred embodiment of the present invention, as shown in the Figures, a feed device for shaping equipment includes a large horizontal table top 2 with a smooth surface upon which objects can slide around with complete freedom of movement by rotation or translation or both. And, as best shown in FIG. 2, a track 17 is mounted onto the table 2 for movement thereon upon engagement with drive means, to be discussed hereinafter. Mounted onto the track 17 is a pallet 3 which supports a template 5 and a workpiece 7. For a better understanding of one feed assembly for use with a cam follower assembly as discussed hereinafter, reference is made to U.S. Pat. No. 3,447,420.

A conventional rotary cutting tool 8 is mounted for rotation on a vertical axis of a drive shaft 10 which is energized by a conventional moter in a housing 12. Close below and to support the cutter 8 a rotatable shaft collar 18 of conical form, coaxial with the shaft 10 is provided. Shaft collar 18 is spaced from and surrounded by a bearing assembly or a split shelf collar 21. Split shelf collar 21 is in two portions, an upper rotatable portion 23 and a lower stationary ring portion 25 with bearings 19 therebetween. Seals 27 and 33 are also provided between portions 23 and 25 to provide support for rotatable portion 23 and also to enable a spacing between portions 23 and 25. Seals 27 and 33 are generally hard rubber or other flexible or elastomeric materials which will not wear excessively upon movement of upper portion 23. Upper portion 23 bears upon the bearings 19 at the point shown by numeral 29 to hold the bearings 19 in place.

The upper portion 23 is provided with apertures 35 therein and the lower portion 25 is provided with apertures 34 therein disposed at preselected positions therearound to receive a pin (not shown) therethrough for separating the upper and lower portions 23 and 25 for easy access to the bearings 19.

Split collar 21 is mounted onto table 2 by a plurality of fastening members 20 disposed circumferentially around collar 21 at preselected positions thereon.

Split shelf collar 21 is provided with a ledge 22 on the upper portion 23 which extends outwardly to underlie the edge of the template 5 which carries the pattern and, by bearing against the shelf collar 21 determines the movement of a workpiece or pieces 7 toward and away from the cutting tool 8, as rotation of the entire template 5 and workpiece 7 carries the operative edge of the template 5 in sliding motion with the upper portion 23 to expose, successively, the entire periphery of the workpiece to the action of the cutter 8.

Shims 42 of preselected thickness are provided for spacing the workpiece 7 from the template 5 for proper alignment of the workpiece 7 with the cutting tool 8. A hold down means, shown as a stationary shoe 44, is provided to hold the workpiece 7 tight against the template 5 to prevent slippage of workpiece 7 upon engagement with the cutting tool 8. It is realized that other hold down means, such as clamps, and the like, may also be used.

Figure 1:
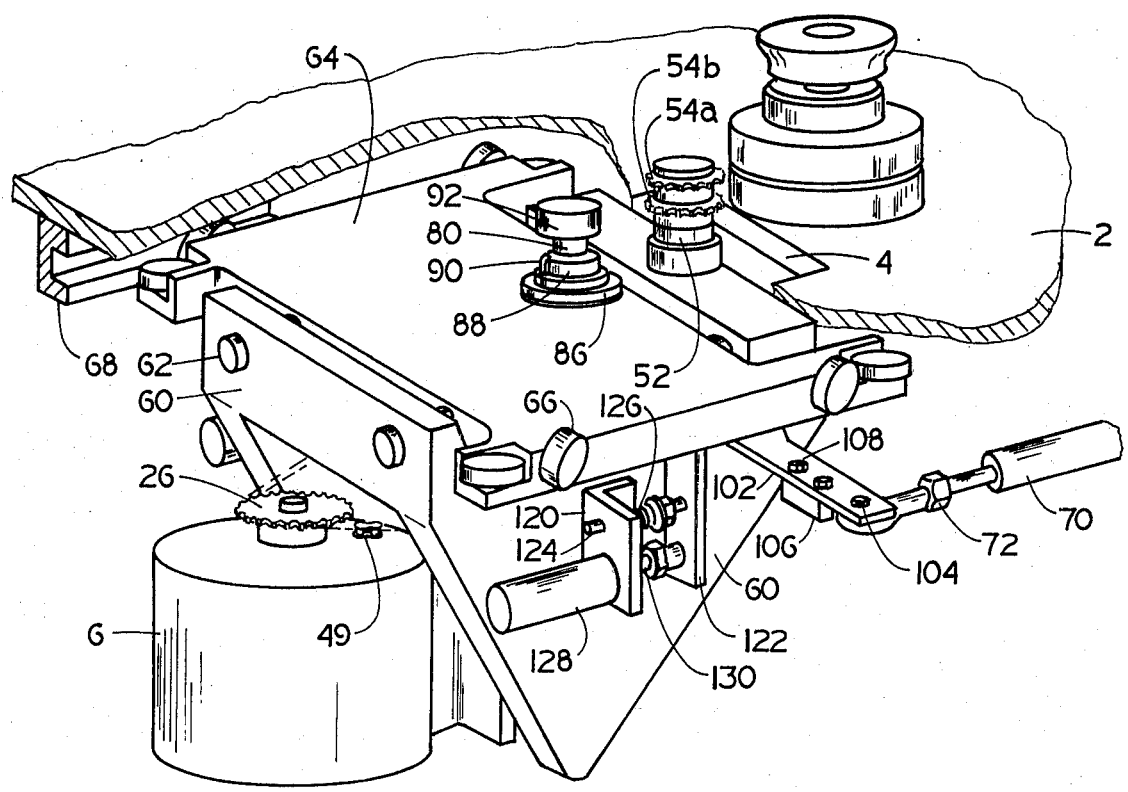
FIG. 1 is a perspective view, partially cutaway, of a feed device for automatic shaping equipment including a preferred bearing assembly of the present invention.

In FIG. 1, table top 2 is provided with an opening 4 therethrough to receive drive means for the feed device. The drive means includes a drive motor 6 to which a driving sprocket 26 is mounted and driven thereby. The drive means further includes appropriate clutch and gears, which are well known in the art and are therefore not shown, with an appropriate chain 49 to which a vertically extending rotatable mounted drive shaft 52 is attached. Mounted to the upper extremity of drive shaft 52 is a twin unit pinion having an upper set of teeth 54a and a lower set of teeth 54b for engaging with cooperating apertures in track 17, track 17 having two rows of apertures identifiable by numerals 56a and 56b. The two sets of teeth 54a and 54b are rigid with respect to each other and co-axial therewith. Preferably, the teeth of 54a and 54b are offset in respect to each other by half the pitch of the gear teeth so that the upper row of apertures 56a receive the teeth 54a and the lower row of apertures 56b receive the teeth 54b. This offset arrangement enables teeth 54a to be in transition from one rack tooth to the next and simultaneously therewith teeth 54b are in the middle of their working path so they have perfect and effective arrangement at a time when teeth 54a are positioned at angles whereby they do not carry the load effectively. This enables smooth and effective driving of the track 17.

One preferred feed device for use in an automatic shaping device includes a stationarily mounted frame member 60 with a pair of aligned apertures on opposed sides thereof to recieve a pair of slidably mounted rod members 62 therethrough. Slidably mounted rod members 62 support and have attached thereto a movable flat plate member 64. Flat plate member 64 on opposed sides thereof is provided with a pair of aligned apertures through which the rod members 62 are received. Movable flat plate member 64 is provided with a pair of rollers 66 on each end thereof movable within elongated brackets 68 of L-shaped cross-section. Brackets 68 are fixedly attached, generally by welding to the underside of table 2.

The driving force for moving the feed device in a horizontal direction is an air cylinder 70 fixedly attached to the frame of a shaper 71 with a movable piston 72 therein movable in response to actuation by any well-known means presently used in the art, such as is described in my co-pending application filed Mar. 27, 1978, Ser. No. 890,138.

Attached to one end of the piston 72 is a horizontally extending flat plate support member 102, piston 72 being bolted to support 102 by bolt member 104. Also attached to the support 102 is a stop member 106 which is a vertically attached flat plate member, stop member 106 being attached to the support 102 by bolt members 108.

A drive assembly for driving the track 17 is also provided. This assembly includes a movable piston 80 which at its upper extremity has connected thereto a cam follower 92 which is vertically movable by piston 80 for engagement with the inner surface 94 of track 17. Piston 80 is movable in response to air cylinder 78 which is actuated by any well-known means presently used in the art and will, therefore, not be discussed in detail. A guide sleeve 86 is fixedly attached to the piston 80 just below the cam follower 92 to receive collar 88 therein. Sleeve 86 is provided with a key-way to receive a key 90 therein, key 90 being attached to the collar 88.

The feed device is also provided with biasing means to hold the cam follower 92 against the inner surface 94 of track 17 and yet allow for varying thicknesses of track 17 without interfering with the operation of the device of the present invention. The biasing means includes an outwardly extending L-shaped bracket 120 fixedly attached, generally by welding, to frame member 60. Another L-shaped bracket 122 which is downwardly extending and fixedly attached to movable plate member 64, generally by welding, is also provided.

Bracket 120 includes an aperture therein to receive a bolt 124 therethrough. Bolt 124 extends through the bracket 120 and is fixedly attached to bracket 122 with a spiral spring 126 therearound disposed between brackets 120 and 122. An air cylinder 128 with piston 130 operable thereby is also attached to brackets 120 and 122 to maintain a positive pressure on plate member 64 through the bracket 122. Thus, upon changes in the thickness or other variables of the track 17, cooperation of the biasing means and the air cylinder means allows for movement of the cam follower assembly to compensate for the malfunction without harming the equipment.

In the operation of a shaping device in combination with a preferred bearing assembly of the present invention, a template 5 and a workpiece 7 are mounted onto a pallet 3, as discussed hereinbefore, with a stationary shoe 44 being placed upon workpiece 7 to hold the workpiece 7 in a fixed position upon the pallet 3. The template 5 is positioned onto the ledge 22 of the split shelf collar 21 and bears thereon. The drive motor 6 is then actuated wherein track 17 moves template 5, template 5 bearing against the split shelf collar 21 turns the upper rotatable portion 23 in response to the bearing contact therewith.

In order to change the bearings 19 in the bearing assembly, a pin (not shown) is driven, individually, into the openings 34 and 35 therearound thereby separating the upper portion 23 from the lower portion 25, enabling easy access to the bearing 19.

It will be realized that various changes may be made to the specific embodiment shown and described without departing from the principles of the present invention.

We claim:

1. In an automatic shaping device that includes a frame, a table mounted onto said frame, a movable template mounted onto said table, means to move said template in driving relation with said template, shaping means mounted above said table, a power-driven workpiece carrying member mounted to said table, and means to feed a workpiece to said shaping means, the improvement comprising:

bearing means coaxial with said shaping tool and supporting said template adjacent to said shaping tool, said bearing means including means to limit advance of said workpiece toward said shaping tool, said bearing means being movable in response to movement of said template.

2. In an automatic shaping device of claim 1 wherein said bearing means includes a split collar having a rotatable upper portion and a stationary lower portion with bearings therebetween.

3. In an automatic shaping device of claim 2, said upper portion having ledge means receiving said template thereon.

4. In an automatic shaping device of claim 2, said upper portion and said lower portion being in spaced relation with sealing means disposed therebetween.

5. In an automatic shaping device of claim 2, said split collar being axially aligned and surrounding a rotatable shaft, said rotatable shaft having said shaping means attached thereto, said shaft being driven by drive means to rotate said shaping means.

* * * * *